US012576883B2

(12) United States Patent
Zhang et al.

(10) Patent No.: US 12,576,883 B2
(45) Date of Patent: Mar. 17, 2026

(54) SYSTEM AND METHOD FOR EMBEDDING UNCERTAINTY ESTIMATION INTO DEEP-NEURAL-NETWORK-BASED AUTONOMOUS DRIVING PERCEPTION FRAMEWORKS

(71) Applicant: Black Sesame Technologies Inc., San Jose, CA (US)

(72) Inventors: Gongjie Zhang, Singapore (SG); Jiahao Lin, Singapore (SG); Shuang Wu, Singapore (SG); Yilin Song, Santa Clara, CA (US); Mukun Guo, Singapore (SG); Zuoguan Wang, Santa Clara, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 129 days.

(21) Appl. No.: 18/601,754

(22) Filed: Mar. 11, 2024

(65) Prior Publication Data

US 2025/0282376 A1 Sep. 11, 2025

(51) Int. Cl.
*B60W 60/00* (2020.01)
*G06V 10/82* (2022.01)
*G06V 20/56* (2022.01)

(52) U.S. Cl.
CPC ........... *B60W 60/001* (2020.02); *G06V 10/82* (2022.01); *G06V 20/56* (2022.01); *B60W 2420/403* (2013.01); *B60W 2556/20* (2020.02)

(58) Field of Classification Search
CPC ......... B60W 60/001; B60W 2420/403; B60W 2556/20; G06V 10/82; G06V 20/56
See application file for complete search history.

(56) References Cited

U.S. PATENT DOCUMENTS

| | | | |
|---|---|---|---|
| 11,594,016 B1 * | 2/2023 | Zhou | G06V 20/56 |
| 11,822,544 B1 * | 11/2023 | Carvalho | G06N 20/00 |
| 12,055,941 B1 * | 8/2024 | Crego | G05D 1/0214 |
| 2019/0310627 A1 * | 10/2019 | Halder | G05D 1/0033 |
| 2019/0310636 A1 * | 10/2019 | Halder | G05D 1/0223 |
| 2020/0298891 A1 * | 9/2020 | Liang | G06V 20/58 |
| 2022/0114805 A1 * | 4/2022 | Jarquin Arroyo | G06N 3/08 |

(Continued)

FOREIGN PATENT DOCUMENTS

WO WO-2023037136 A1 * 3/2020 ........... G06V 10/764

*Primary Examiner* — Redhwan K Mawari
(74) *Attorney, Agent, or Firm* — Yao Legal Services, Inc.; Shun Yao

(57) ABSTRACT

Embodiments of this disclosure can provide a system and method for training a perception model to perform an autonomous driving task. During operation, the system can obtain labeled training data comprising images captured by multiple cameras mounted at different locations on a vehicle, and the perception model can generate, in parallel, a prediction output associated with the task and a confidence score based on the labeled training data. The confidence score can indicate a level of uncertainty associated with the prediction output. The system can generate an uncertainty-weighted prediction based on ground truth indicated by the labeled training data, the prediction output, and the confidence score; compute a loss function based on the uncertainty-weighted prediction; and update the perception model based on the loss function.

17 Claims, 10 Drawing Sheets
(4 of 10 Drawing Sheet(s) Filed in Color)

(56)  References Cited

U.S. PATENT DOCUMENTS

| | | | |
|---|---|---|---|
| 2022/0237520 A1* | 7/2022 | Wang | G06N 20/00 |
| 2023/0281955 A1* | 9/2023 | Ackerson | G06V 10/60 |
| | | | 382/274 |
| 2025/0148372 A1* | 5/2025 | Verbeke | G06V 20/70 |
| 2025/0169734 A1* | 5/2025 | Dawson | A61B 5/7475 |

* cited by examiner

300

Start

Read input images
Extract BEV features from input images

302

Parallel do:
       Predict regression output $Reg$
       Predict classification output $Cls$
       Predict confidence score $C$
End

304

Apply confidence score to predictions $$Cls_{u-w} = C \cdot Cls + (1-c) \cdot Cls_{gt}$$

$$Reg_{u-w} = C \cdot Reg + (1-c) \cdot Reg_{gt}$$

End

306

Apply loss and backpropagation gradient

End

604

602

| | LANE LINES | CURBSIDES | STOP LINES | CROSSWALKS |
|---|---|---|---|---|
| BASELINE | 51.1 | 39.6 | 13.2 | 15.7 |
| WITH UNCERTAINTY | 52.6 | 41.6 | 14.0 | 18.2 |

SYSTEM AND METHOD FOR EMBEDDING UNCERTAINTY ESTIMATION INTO DEEP-NEURAL-NETWORK-BASED AUTONOMOUS DRIVING PERCEPTION FRAMEWORKS

BACKGROUND

Field

This disclosure generally relates to autonomous driving. More specifically, the disclosed systems relate to incorporating uncertainty estimation into deep-neural-network-based autonomous driving perception frameworks.

Related Art

Autonomous driving perception is a critical aspect of autonomous driving systems as it enables a self-driving vehicle to make informed decisions based on real-time data from the environment. Autonomous driving perception can include a vast array of individual perception tasks, each contributing significantly to the overall efficacy of the autonomous driving system. For example, environment perception is a task for providing the vehicle with crucial information on the driving environment, including the free drivable areas and surrounding obstacles' locations, velocities, and even predictions of their future states.

There have been numerous works in machine-learning-based autonomous driving perception. However, most of these works overlook the effect of uncertainties in the predictions. The estimation of uncertainty in each perception task is highly crucial for practical applications in autonomous driving due to safety and reliability concerns.

SUMMARY

Embodiments of this disclosure can provide a system and method for training a perception model to perform an autonomous driving task. During operation, the system can obtain labeled training data comprising images captured by multiple cameras mounted at different locations on a vehicle, and the perception model can generate, in parallel, a prediction output associated with the task and a confidence score based on the labeled training data. The confidence score can indicate a level of uncertainty associated with the prediction output. The system can generate an uncertainty-weighted prediction based on ground truth indicated by the labeled training data, the prediction output, and the confidence score; compute a loss function based on the uncertainty-weighted prediction; and update the perception model based on the loss function.

In a variation on this embodiment, the perception model can include a Bird's Eye View (BEV)-based perception model.

In a variation on this embodiment, the prediction output can include a classification prediction and/or a regression prediction.

In a variation on this embodiment, generating the uncertainty-weighted prediction can include computing a linear combination of the ground truth and the prediction output with the prediction output weighted by the confidence score.

In a variation on this embodiment, computing the loss function can further include adding a regularization loss term, which can be determined based on the confidence score and a hyperparameter.

In a further variation, the hyperparameter can be dynamically adjusted during training based on a cap value of the regularization loss term.

In a further variation, the system can decrease the hyperparameter in response to the regularization loss term being greater than or equal to the cap value and increase the hyperparameter in response to the regularization loss term being less than the cap value.

In a variation on this embodiment, the system can select a subset of the labeled training data and associate prediction outputs generated based on the selected subset of labeled training data with a static confidence score.

DESCRIPTION OF THE FIGURES

This present application is submitted with colored drawings. In accordance with 37 C.F.R. § 1.84(a)(2), a petition is submitted to request acceptance of the colored drawings as the only practical medium by which aspects of the subject matter sought to be patented in this application may be accurately conveyed. The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

Embodiments of this disclosure provide a system and method for incorporating uncertainty estimation into a deep-neural-network-based autonomous driving perception framework. Unlike conventional perception models that overlook the level of uncertainty in their predictions, the proposed perception network can incorporate uncertainty estimation starting from the training phase. More specifically, each prediction head in the perception network can be augmented with an additional confidence dimension, which indicates the network's confidence in its corresponding predictions. During training, predictions used to produce losses can be modified according to their corresponding confidence scores such that they are closer to the ground truth (GT) targets. In some embodiments, an uncertainty-weighted prediction can be generated by interpolating between the GT target and the original prediction based on the predicted confidence score. The perception model can also include a regularization loss to penalize low-confidence predictions. Moreover, the regularization loss can be dynamically adjusted based on a cap value.

Uncertainty-Augmented Perception Models

In autonomous driving, deep-neural-network-based models are used to predict environmental information around the ego vehicle (i.e., the vehicle carrying various sensors), including features like lanes, curbs, crosswalks, intersections, road paths, vehicles, pedestrians, as well as various dynamic parameters like speed estimation and motion. These predictions can be utilized by downstream planning and control tasks. Conventional perception models often neglect the uncertainty inherent in perception tasks. However, autonomous vehicles often operate in a complex and dynamic environment where significant uncertainty in the perception may arise due to factors like obstructions, limited viewing angles, and the unpredictable nature of other road users. The uncertainty in perception becomes especially critical when considering downstream tasks like planning and control in autonomous driving, which rely on the perception output as the fundamental input.

Figure 1:
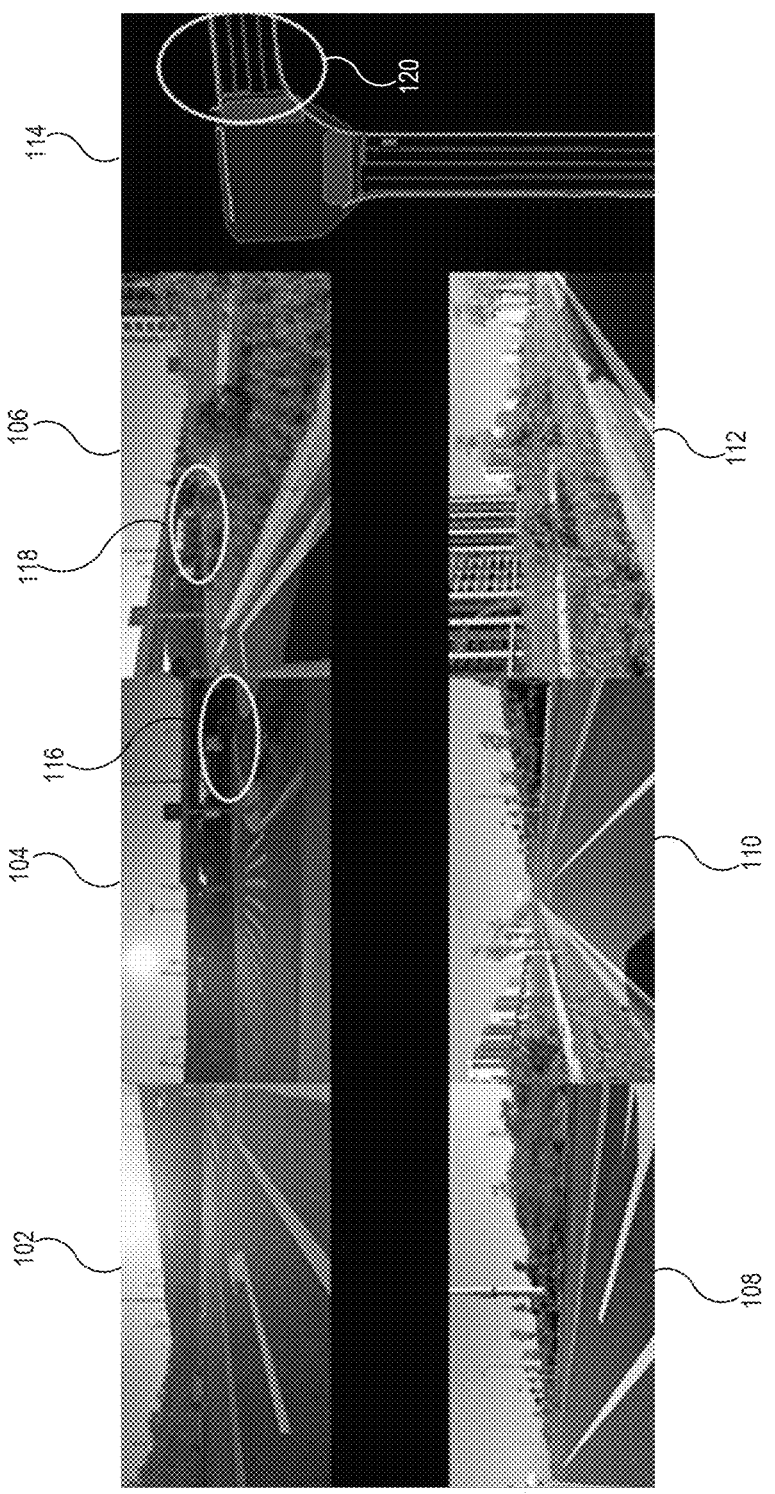
FIG. 1 illustrates an exemplary scenario where the perception model does not consider uncertainties in predictions, according to prior art.

FIG. 1 illustrates an exemplary scenario where the perception model does not consider uncertainty in predictions, according to prior art. In this example, the perception model can be based on a Bird's-Eye-View (BEV) framework, which can extract a holistic representation of the environment from multi-camera images. In the example shown in FIG. 1, six images (i.e., images 102-112) captured by cameras installed at different locations (e.g., the front, back, and sides) of the ego vehicle can be used to produce a map-vectorization prediction 114, which shows a road map. Note that images 102-112 correspond to the road-level view or perspective view of the environment from different viewing angles, whereas map-vectorization prediction 114 corresponds to the BEV of the environment. Lines of different colors in prediction 114 correspond to different road objects (e.g., lane lines, curbs, crosswalks, etc.).

FIG. 1 also shows occluded regions 116 and 118 (which are in images 104 and 106, respectively). In other words, regions 116 and 118 cannot be seen clearly by the cameras due to their obscured field of view, which can result in an elevated level of uncertainty in a corresponding region 120 in prediction 114. However, current perception models typically treat all regions in prediction 114 equally, ignoring the fact that region 120 has a high level of uncertainty due to occlusion. This lack of distinction in perception uncertainty can result in incorrect or unsafe decisions in the subsequent planning and control tasks.

Just as a human driver might slow down in fog due to uncertainty about what lies ahead, an autonomous driving system needs to gauge its own level of confidence in its perceptions. Incorporating uncertainty estimation into the deep-neural-network-based autonomous driving perception framework not only can improve safety by providing the system a measure of its own prediction confidence but also serve as a valuable input to upper-layer planning and control systems. The improved autonomous driving system can then make more informed, context-aware decisions, akin to a human driver adjusting their driving based on their level of certainty about their surroundings.

To incorporate the prediction uncertainty into the perception models, some embodiments of the present invention can modify each prediction head in the deep-learning neural network to include an additional confidence branch or subtask for predicting a confidence score of the current predictions. Moreover, the regression and classification predictions can be combined with (e.g., through interpolation with the ground truth) the confidence score when used in loss calculations.

Figure 2:
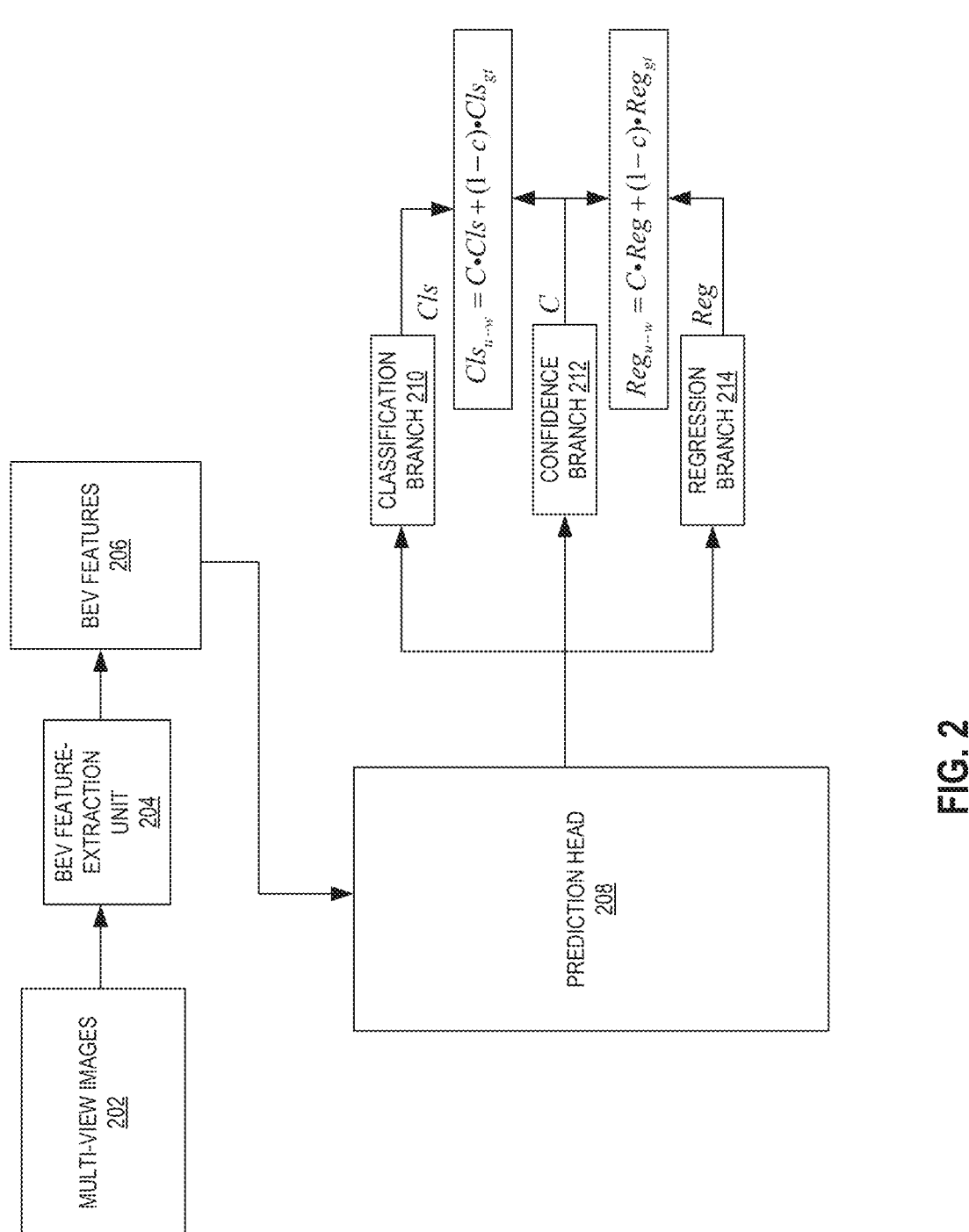
FIG. 2 illustrates an exemplary architecture of the perception framework with embedded uncertainty estimation, according to one embodiment of the instant application.

FIG. 2 illustrates an exemplary architecture of a perception framework with embedded uncertainty estimation, according to one embodiment of the instant application. In FIG. 2, multi-view images 202 can be sent to a BEV feature-extraction unit 204 for feature extraction. Multi-view images 202 can include images taken by cameras mounted on the front, back, and two sides of the ego vehicle. In one example, six images (similar to images 102-112) can be sent to BEV feature-extraction unit 204. BEV feature-extraction unit 204 can extract BEV features 206 from the six images. In one embodiment, BEV feature-extraction unit 204 can transform 2D image features from multi-view images 202 into BEV features using various mechanisms. For example, an Inverse Perspective Mapping (IPM) algorithm can be used to convert the perspective view of a traffic scene into BEV.

BEV features 206 (which can be in the form of a BEV feature map) can then be sent to a prediction head 208, which can perform a specific task for autonomous driving such as 3D object detection or semantic segmentation. It is important to note that in the example shown in FIG. 2, only one prediction head is displayed. However, in practice, a perception framework can include multiple prediction heads, each performing a specific perception task, making predictions associated with that task.

In one embodiment, prediction head 208 can include a map decoder (not shown in FIG. 2) that can query the BEV feature map to output instance latent features. The instance latent features can then be sent to different prediction branches, each performing a subtask. A conventional prediction head for 3D object detection typically can include a classification branch for predicting the classification of an object and a regression branch for predicting the location and pose of that object. In the example shown in FIG. 2, each prediction head can incorporate uncertainty estimation in its predictions by including an additional confidence branch for predicting a confidence score of its classification and regression predictions. In the example shown in FIG. 2, prediction head 208 includes a classification branch 210, a confidence branch 212, and a regression branch 214. The three branches can operate in parallel based on the same BEV feature input. In some embodiments, the confidence score can be expressed as a percentage value, with 0% indicating no confidence and 100% indicating full confidence in the predictions.

The independent prediction outputs of the classification, confidence, and regression branches can be denoted Cls, C, and Reg, respectively. In some embodiments, to differentiate high-confidence predictions from low-confidence predictions, while training the classification and regression models (e.g., deep-learning neural networks), in each training iteration, the outputs of classification branch 210 and regression branch 214 can be combined with the confidence score produced by confidence branch 212. More specifically, during backpropagation, predictions with higher confidence scores can play a more important role in generating the loss function than predictions with lower confidence scores. In some embodiments, the predictions can be combined with the ground truth based on the confidence score. In one embodiment, a linear combination (e.g., a convex combination) or interpolation technique can be used to interpolate the predictions with the ground truth to generate uncertainty-weighted predictions, using the confidence scores as a weight factor.

In one example, the uncertainty-weighted classification prediction can be generated based on $Cls_{u-w}=C \cdot Cls+(1-C) \cdot Cls_{gt}$, where $Cls_{u-w}$ is the uncertainty-weighted prediction and Cls, is the ground truth of the classification. In an extreme case where the confidence score is 0, the prediction output of classification branch 210 (i.e., Cls) will not be included in the loss computation. Instead, the loss computation will only use the ground truth of the classification. On the other hand, when the confidence score is 100%, the loss will be computed only based on Cls. In most cases where the confidence score is between 0 and 100%, the loss computation can be based on $Cls_{u-w}$, which is a weighted combination of the prediction and the ground truth. Similarly, the uncertainty-weighted prediction of the regression can be generated based on $Reg_{u-w}=C \cdot Reg+(1-C) \cdot Reg_{gt}$.

Experiments have shown that the perception model can produce high uncertainty (or low confidence scores) for areas that are blocked, too far away, or invisible due to constrained viewing angles and produce low uncertainty (or high confidence scores) for areas with clear visibility. These confidence scores can thus allow the perception model to recognize invisible, blocked, or blurry areas. Accordingly, the model can dynamically reduce the weight of these regions (e.g., a low confidence score means a lower weight) during the training process, thus preventing the overfitting of the model to ground truths that are invisible or too blurry to learn.

Figure 3:
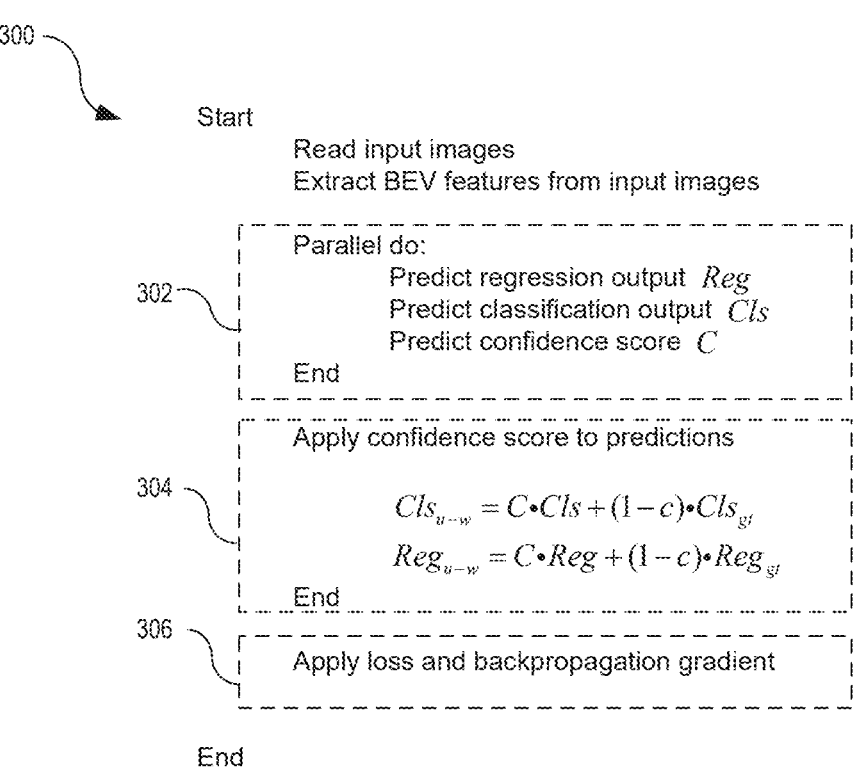
FIG. 3 illustrates exemplary pseudocodes for embedding uncertainty estimation into a Bird's Eye View (BEV) perception framework, according to one embodiment of the instant application.

FIG. 3 illustrates exemplary pseudocodes for embedding uncertainty estimation into a Bird's Eye View (BEV) perception framework, according to one embodiment of the instant application. In the example shown in FIG. 3, a BEV perception task 300 can be an object detection task that outputs classification and regression predictions. More specifically, each iteration in perception task 300 can include a prediction stage 302, an uncertainty-embedding stage 304, and a backpropagation stage 306.

Prediction stage 302 can include parallel operations of predicting the regression (Reg), classification (Cls), and confidence score (C). Uncertainty-embedding stage 304 can include applying the confidence score to the regression and classification predictions. In this example, uncertainty-weighted predictions of the regression and classification can be generated as linear combinations (or interpolations) between the predictions and the ground truth values, where the weight coefficients are determined based on the confidence score. Other combination or interpolation techniques (e.g., non-linear interpolation) can also be used to generate uncertainty-weighted predictions.

In backpropagation stage 306, loss functions can be computed based on the uncertainty-weighted predictions. The loss function can be of any type, including but not limited to a mean squared error (MSE) loss function, a cross-entropy loss function, a focal loss function, a logarithmic loss function, etc. The scope of this disclosure is not limited by the type of loss function used during training. The deep-learning neural network is trained to minimize the loss function. Various optimization algorithms can be employed for training the neural network. In some embodiments, the network can be trained using gradient descent (e.g., Adam) and backpropagation algorithms.

If the confidence score is directly used in the training process (i.e., in the loss computation), it may cause the model to lean heavily towards low confidence, as low-confidence data are replaced with ground truth data, which minimizes training loss. To address this issue, a structured training strategy can be employed. More specifically, a regularization term can be added to the original loss function to foster greater confidence. In some embodiments, the regularization term in the loss function (i.e., $L_{regulatization}$) can be computed based on the negative logarithm of the confidence score (i.e., $L_{regulatization}=-\lambda_1 \log(C)$), where $\lambda_1$ is a hyperparameter that can be dynamically adjusted during training. For example, if the original loss function is based on MSE, the uncertainty-augmented loss function can be $Loss=Loss_{MSE}-\lambda_1 \log C$. This way, a very low confidence score (e.g., C approaching 0) can result in a very high loss. The regularization loss term is designed to penalize low-confidence predictions, thus encouraging the perception model to generate high-confidence predictions whenever possible.

In some embodiments, to encourage learning in an uncertain environment, instead of applying the uncertainty estimation (i.e., confidence score) to all training data, a stochastic selection mechanism can be used to select only a subset of the data for embedding the uncertainty estimation, whereas other data can be treated as trustworthy (i.e., allocated with a static confidence score of 100%). In some embodiments, for every batch of data, the system can randomly select a fraction of the data batch to embed uncertainty during training (i.e., to predict confidence scores in each training iteration). The fraction (denoted 22) of the randomly selected data can be an adjustable hyperparameter between 0 and ½. In one example, about ¼ of a data batch can be selected to embed the uncertainty estimation during training. In alternative embodiments, for each data batch, the system can randomly select a subset of data and associate a static confidence score (e.g., 100%) to predictions made based on the selected subset of data. The network will predict confidence scores for predictions made based on other data.

The uncertainty in the predictions may vary during the training process. A well-trained model typically can have a lower level of uncertainty than the ones that are not yet trained. In some embodiments, the training of the perception models can implement an uncertainty-related loss cap ($L_{cap}$)

to limit the maximum loss resulting from skewed confidence values. More specifically, the weight of the uncertainty-related loss term or the regularization loss $L_{regulatization}$ can be adjusted based on the set cap. If regularization loss $L_{regulatization}$ is equal to or greater than the set cap $L_{cap}$, the weight of the confidence score can be decreased slightly by reducing hyperparameter $\lambda_1$ used for computing the regularization loss. In some embodiments, during training, hyperparameter $\lambda_1$ can be dynamically adjusted based on an additional hyperparameter $\alpha$, where $\lambda_1=\lambda_1/\alpha$. If $L_{regulatization} \geq L_{cap}$, then $\alpha>1$ (e.g., $\alpha=1.01$). On the other hand, if $L_{regulatization}<L_{cap}$, then $\alpha<1$ (e.g., $\alpha=0.99$). This way, the regularization loss can be kept within a predetermined range based on $L_{cap}$, regardless of the initial value of hyperparameter $\lambda_1$.

Once the perception model is trained, it can be used to perform various perception tasks. In one example, the perception model can be trained to perform map vectorization, which refers to the process of constructing a map based on images and converting each map element into a vector. In addition to predicting vectorized map elements (e.g., lanes, curbsides, stop lines, crosswalks, etc.), the perception model can also output the confidence scores of these predicted map elements. In one example, each predicted map element can be associated with a predicted confidence score. Accordingly, downstream planning and control tasks that rely on these predictions can take into consideration the level of uncertainty associated with each prediction.

Figure 4A:
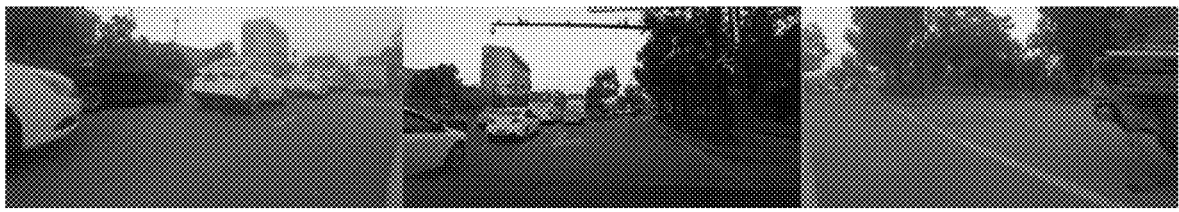
FIGS. 4A-4C illustrate an exemplary scenario of using the uncertainty-enhanced perception model for map vectorization, according to one embodiment of the instant application.
Figure 4A:
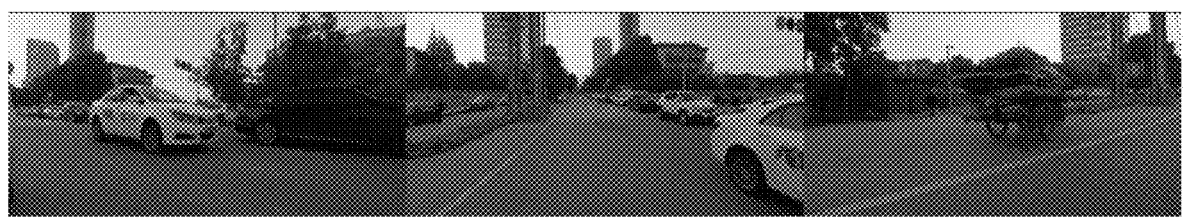
Figure 4B:
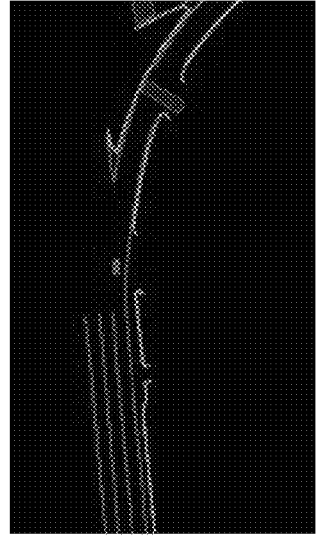
Figure 4C:
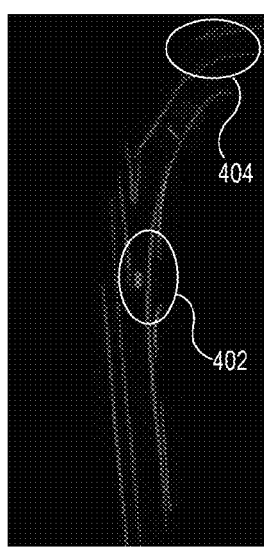

FIGS. 4A-4C illustrate an exemplary scenario of using the uncertainty-enhanced perception model for map vectorization, according to one embodiment of the instant application. FIG. 4A shows the BEV images captured by cameras on the ego vehicle, FIG. 4B shows the ground truth of the vectorized map, and FIG. 4C shows the vectorized map predicted by the uncertainty-enhanced perception model. In FIGS. 4B and 4C, lines of different colors indicate different types of map elements. For example, the green lines indicate curbsides, whereas the red lines indicate the lane lines. Moreover, in FIG. 4C, the confidence scores associated with the predicted map elements are represented using the brightness of the lines. More specifically, brighter segments (e.g., segment 402) are predictions with higher confidence scores (or lower levels of uncertainty), whereas darker segments (e.g., segment 404) are predictions with lower confidence scores (or higher levels of uncertainty). As seen in FIG. 4A and FIG. 4C, closer and visible regions (e.g., a region near segment 402) typically have lower levels of uncertainty, whereas faraway and occluded regions (e.g., a region near segment 404) have higher levels of uncertainty.

Figure 5A:
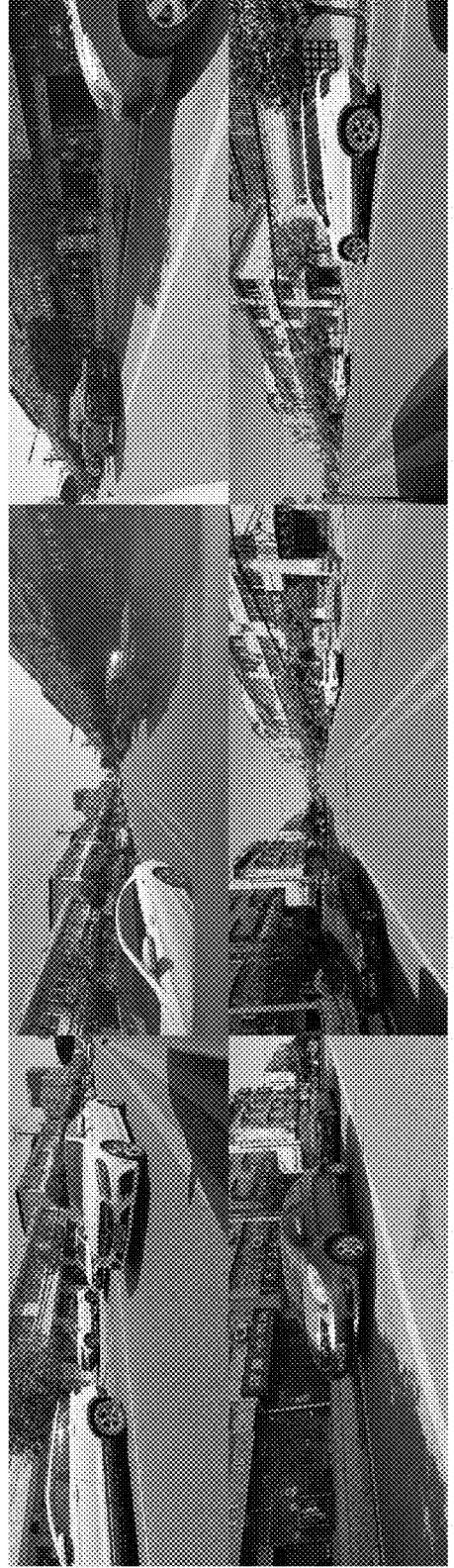
FIGS. 5A-5B illustrate an exemplary scenario of using the uncertainty-enhanced perception model for object detection, according to one embodiment of the instant application.
Figure 5B:
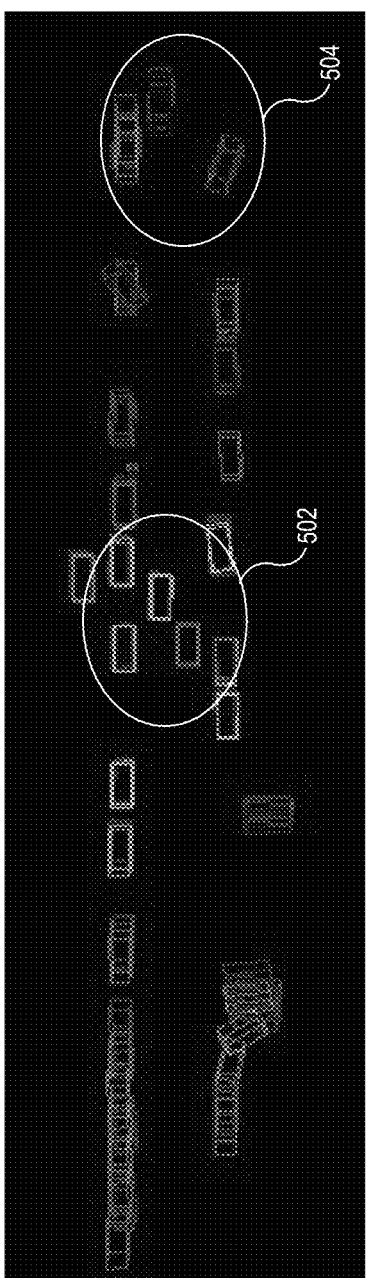

FIGS. 5A-5B illustrate an exemplary scenario of using the uncertainty-enhanced perception model for object detection, according to one embodiment of the instant application. FIG. 5A shows BEV images captured by cameras on the ego vehicle, and FIG. 5B shows the object detection results. As can be seen from FIG. 5B, regions closer to the ego vehicle or the red box (e.g., region 502) have lower levels of uncertainty, and the bounding boxes are illustrated with brighter lines, whereas regions far away from the ego vehicle (e.g., region 504) have higher levels of uncertainty, and the bounding boxes are illustrated with darker lines.

Figure 6:
FIG. 6 illustrates an exemplary scenario of using the uncertainty-enhanced perception model for semantic segmentation, according to one embodiment of the instant application.
Figure 6:
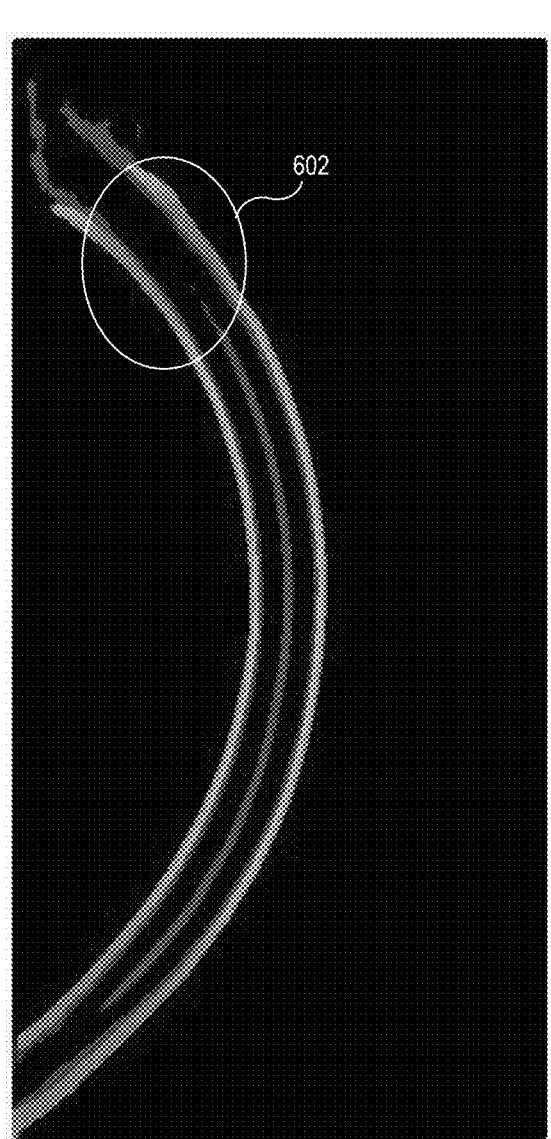

FIG. 6 illustrates an exemplary scenario of using the uncertainty-enhanced perception model for semantic segmentation, according to one embodiment of the instant application. In this example, the left drawing shows the confidence map, where the confidence scores are mapped to grayscale pixel values with higher confidence scores mapped to higher grayscale pixel values. More specifically, white can indicate 100% confidence, whereas black can indicate 0% confidence. The right drawing shows the semantic segmentation result, with green lines indicating segmented curbsides and blue lines indicating segmented lane lines. Like FIG. 4C and FIG. 5B, the uncertainty associated with the prediction output can be reflected using the brightness of the lines. In the example shown in FIG. 6, darker lines in region 602 of the right drawing correspond to the low confidence region 604 of the left drawing.

The uncertainty-enhanced perception models can be applied to a wide range of autonomous driving tasks. In addition to map vectorization, object detection, and semantic segmentation, uncertainty-enhanced perception models can also be used for other tasks like path prediction, motion detection, speed estimation, and more. In addition, the disclosure uses the BEV framework as an example where BEV images are used as input. In practice, other types of perception frameworks or architecture can also use a similar approach to embed uncertainty estimation in predictions into the model learning and training process. For example, machine learning models for robotic control can also use the uncertainty-enhanced model to improve the perception of the robot. The scope of this disclosure is not limited by the architecture and application of the perception models.

Figure 7:
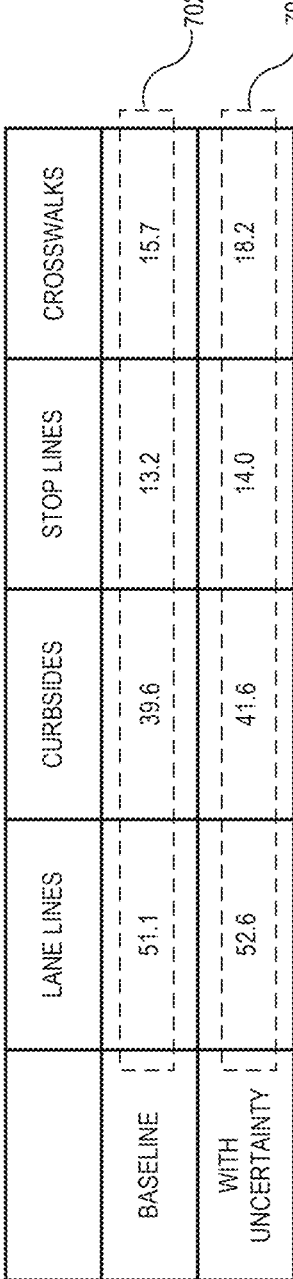
FIG. 7 illustrates the performance metrics of perception models with and without uncertainty considerations, according to one embodiment of the instant application.
Figure 7:

Experimental results have shown that incorporating uncertainty estimation into the perception models can effectively improve the performance of the models. FIG. 7 illustrates the performance metrics of perception models with and without uncertainty considerations, according to one embodiment of the instant application. In FIG. 7, each number in table 700 can represent the average precision value for a particular type of map element (e.g., lanes, curbsides, stop lines, and crosswalks). More specifically, the numbers in row 702 represent the average precision values of the predictions generated by a baseline model, i.e., a perception model without considering prediction uncertainty. On the other hand, the numbers in row 704 represent the average precision values of the predictions generated by the uncertainty-enhanced perception model. As can be seen from FIG. 7, including uncertainty estimation in the model training process can boost the performance of the various tasks of the perception model. For example, after considering uncertainty, the average precision for predicting the lane lines can increase from 51.1 to 52.2. The most significant improvement is in the prediction of the crosswalks, with the average prevision up from 15.7 to 18.2.

Figure 8:
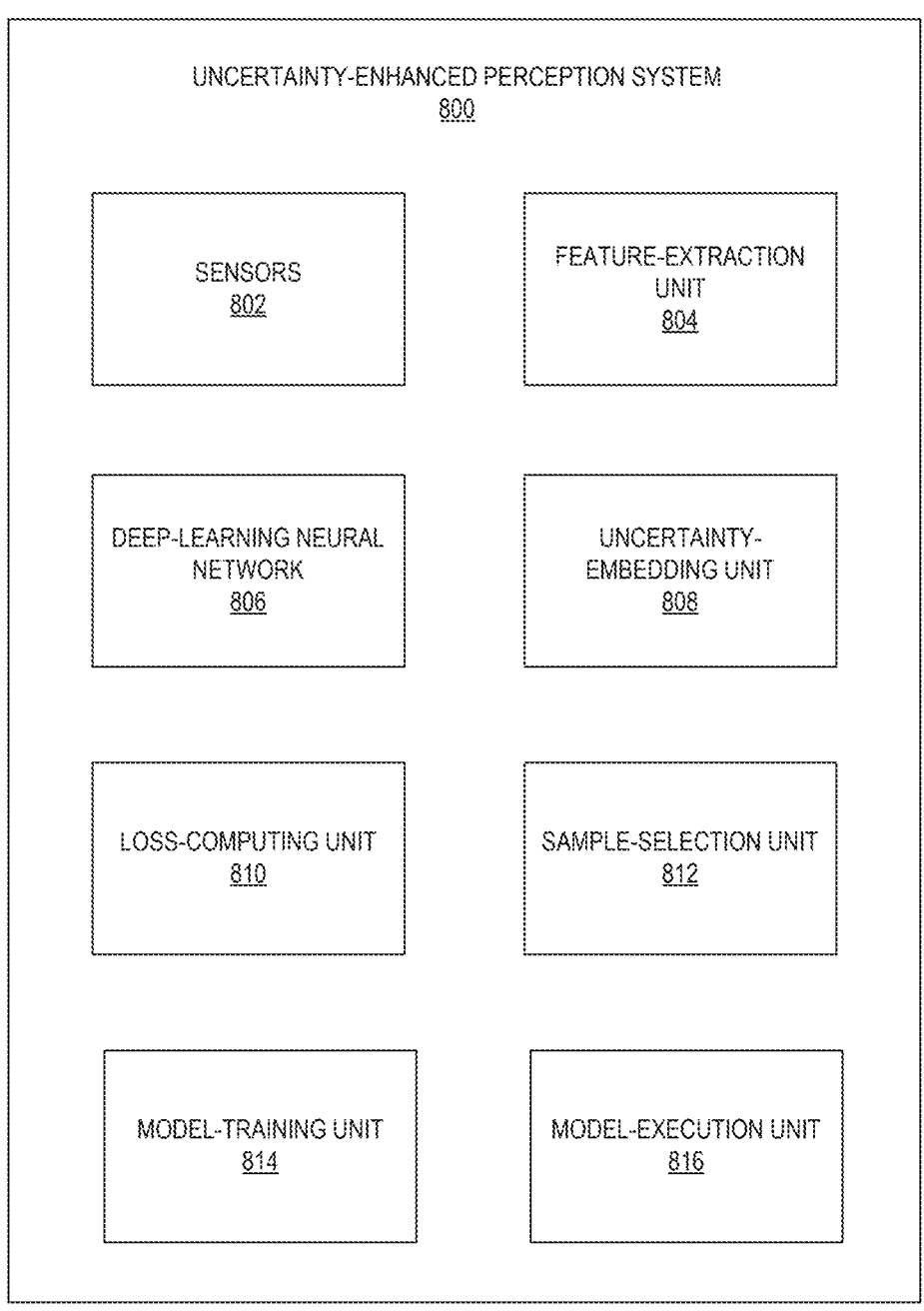
FIG. 8 illustrates an exemplary block diagram of an uncertainty-enhanced perception system for autonomous driving, according to one embodiment of the instant application.

FIG. 8 illustrates an exemplary block diagram of an uncertainty-enhanced perception system for autonomous driving, according to one embodiment of the instant application. Uncertainty-enhanced perception system 800 can include a number of sensors 802, a feature-extraction unit 804, a deep-learning neural network 806, an uncertainty-embedding unit 808, a loss-computing unit 810, a sample-selection unit 812, a model-training unit 814, and a model-execution unit 816.

Sensors 802 can include various types of sensors installed on an ego vehicle used for collecting traffic data. In one embodiment, sensors 802 can include image sensors (e.g., cameras), radars, lidars, Global Positioning System (GPS) sensors, Inertial Measurement Unit (IMU) modules, sound sensors, etc.

Feature-extraction unit 804 can be responsible for extracting features from raw sensor data. In one example, the sensor data can include multi-camera images of the environment surrounding the ego vehicle, and feature-extraction unit 804 can extract BEV features from the images.

Deep-learning neural network 806 can be used to make predictions about the environment surrounding the ego vehicle based on the sensor data. Deep-learning neural network 806 can include multiple prediction heads for performing different tasks, with each prediction head comprising multiple branches for performing different subtasks. In some embodiments, a prediction head in deep-learning neural network 806 can include a classification branch for predicting the classifications of objects in images, a regression branch for predicting the location/pose of each object, and a confidence branch for predicting the confidence scores of the classification and regression predictions.

Uncertainty-embedding unit 808 can be responsible for embedding the uncertainty estimation (e.g., the confidence scores) into the perception model. In some embodiments, uncertainty-embedding unit 808 can generate uncertainty-weighted predictions based on the model predictions in each training iteration, the ground truth values, and the confidence score associated with the predictions. More specifically, the uncertainty-weighted prediction of a particular task or subtask can be computed as a linear combination of the model output and the ground truth, with the confidence score being the weight factor of the model output. For example, the uncertainty-weighted classification prediction can be generated according to $Cls_{u-w} = C \cdot Cls + (1-C) \cdot Cls_{gt}$, and the uncertainty-weighted prediction of the regression can be generated according to $Reg_{u-w} = C \cdot Reg + (1-C) \cdot Reg_{gt}$.

Loss-computing unit 808 can be responsible for computing the loss in each iteration. In some embodiments, when computing the loss, instead of the original model predictions (e.g., Cls and Reg), loss-computing unit 808 applies the uncertainty-weighted predictions (e.g., $Cls_{u-w}$ and $Reg_{u-w}$). In addition, the loss can also be augmented using a regularization term, referred to as the regularization loss. In some embodiments, the regularization loss can be computed based on $L_{regularization} = -\lambda_1 \log(C)$. In further embodiments, the hyperparameter $\lambda_1$ can be dynamically adjusted based on a cap value of the regularization loss. More specifically, $\lambda_1$ can be adjusted downwardly when $L_{regularization} \geq L_{cap}$ and upwardly when $L_{regularization} < L_{cap}$.

Sample-selection unit 812 can be responsible for selecting a subset of samples from each batch of training samples for embedding the uncertainty. In some embodiments, the confidence scores are predicted for only a fraction (e.g., $\lambda_2$) of a sample batch, whereas the remaining samples are assigned with a static confidence score of 100%. In one example, about ¼ of the samples in a batch are selected for embedding the uncertainty, meaning that about ¾ of the samples are assigned with a static confidence score such as 100%. In alternative examples, sample-selection unit 812 can also randomly select a subset of samples to allocate a static, relatively high confidence score (e.g., 90%).

Model-training unit 814 can be responsible for training the perception model using the labeled samples. In some embodiments, model-training unit 814 can use the loss computed by loss-computing unit 810 to optimize the model parameters. In further embodiments, gradient descent and backpropagation approaches can be used for model optimization.

Model-execution unit 816 can be responsible for executing the trained uncertainty-enhanced perception model to generate perception outputs. For example, new data (e.g., images) obtained by sensors 802 can be sent to model-execution unit 816, which can use the new data as input to the trained perception model. The trained perception model can output predictions and confidence scores of the predictions. If the model is trained for detecting objects in an image, the trained model can output bounding boxes with each bounding box associated with a confidence score; if the model is trained for image segmentation, the trained model can output segmented images with each segmented section associated with a confidence score. For autonomous driving applications, the output of the model (including both the predictions and the corresponding confidence scores) can be sent to downstream path planning or control tasks.

Because the uncertainty-enhanced perception model integrates uncertainty estimation starting from the training phase, it can perceive the surrounding environment with an additional dimension (i.e., confidence), enabling downstream tasks to comprehend which regions are clearly visible and which are not. For example, the downstream control task may lower the speed of the vehicle if the confidence scores of the predictions are low, indicating lower visibility.

Figure 9:
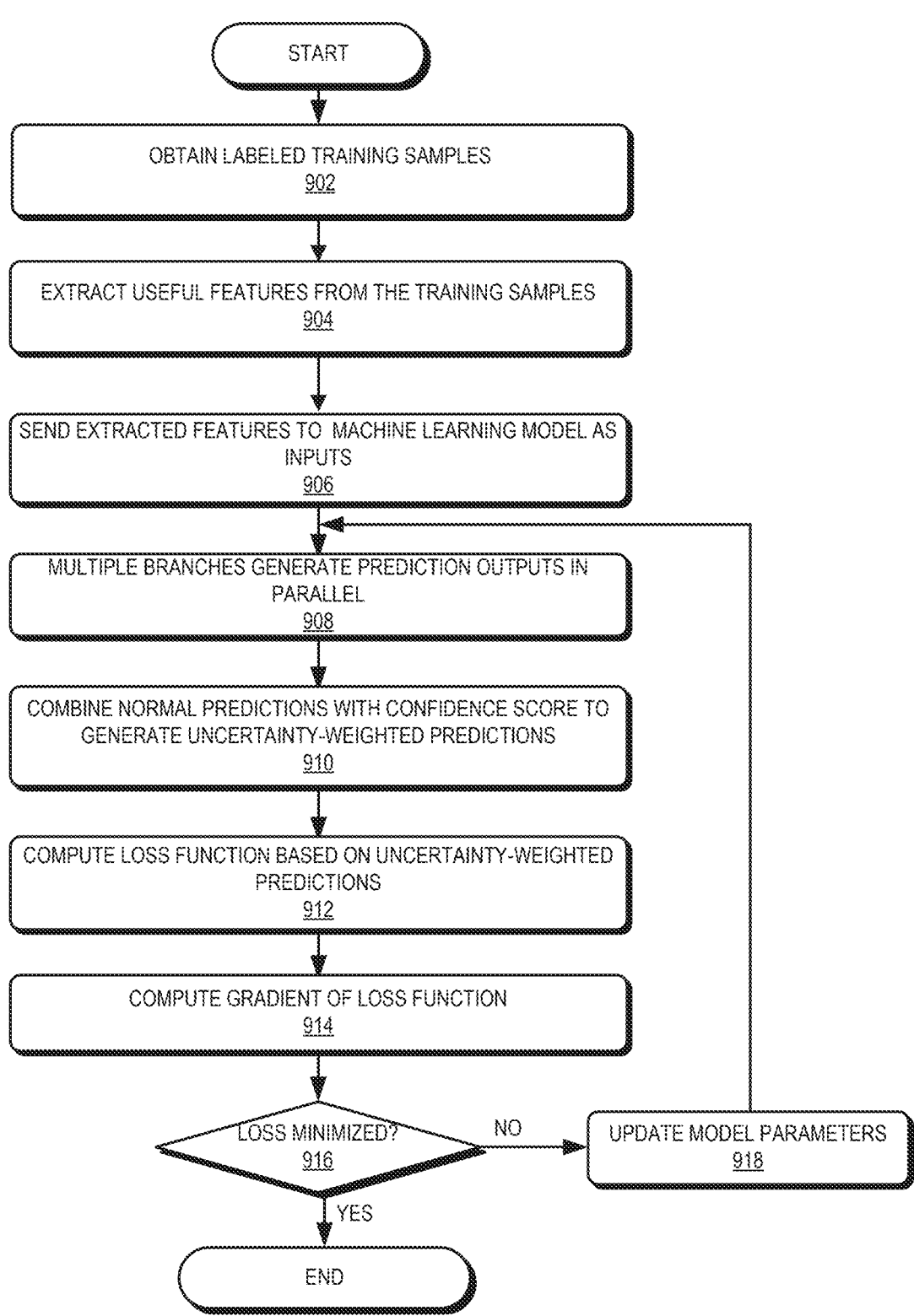
FIG. 9 presents a flowchart illustrating an exemplary training process of an uncertainty-augmented machine learning model, according to one embodiment of the instant application.

FIG. 9 presents a flowchart illustrating an exemplary training process of an uncertainty-augmented machine learning model, according to one embodiment of the instant application. In one or more embodiments, one or more of the steps in FIG. 9 may be repeated and/or performed in a different order. Accordingly, the specific arrangement of steps shown in FIG. 9 should not be construed as limiting the scope of the technique.

During operation, a plurality of labeled training samples can be obtained (operation 902). In one example, the machine learning model can include a perception model for autonomous driving, and the labeled training samples can include BEV images and corresponding ground truth vectorized maps, bounding boxes of detected objects, segmented images, paths, etc. The BEV images can be captured by multiple cameras mounted at different locations of the ego vehicle. The ground truth can be provided through manual labelling of the captured images.

Useful or relevant features can be extracted from the training samples (operation 904). In some embodiments, the machine learning model can comprise a BEV-based perception model, and BEV features can be extracted from BEV images captured by multiple cameras installed on the ego vehicle.

The extracted features can be sent to the machine learning model as inputs to the model (operation 906). In some embodiments, the machine learning model can include a deep-learning neural network with one or more prediction heads for performing one or more tasks. In one embodiment, the machine learning model can be used for autonomous driving applications, and the prediction heads can perform tasks that can include but are not limited to map vectorization, object detection, semantic segmentation, and path prediction.

In further embodiments, each prediction head can also include multiple branches for performing multiple subtasks. The multiple branches of a prediction head can operate in parallel to generate prediction outputs (operation 908). More specifically, the prediction outputs can include normal predictions (i.e., the outputs of the model without considering uncertainty in its predictions) and an uncertainty prediction indicating the model's confidence in its predictions. In one example, a particular prediction head of the machine learning model can output classification and regression predictions as well as a prediction of a confidence score associated with the classification and regression predictions. The confidence score can be between 0 and 1 and can be inversely correlated with the level of uncertainty of the classification and regression predictions.

The model training process can include the step of combining the normal predictions with the confidence score to produce uncertainty-weighted predictions (operation 910). In some embodiments, an uncertainty-weighted prediction (e.g., a classification or regression prediction) can be the linear combination of the normal prediction and the ground truth, with C the confidence score being the weight coefficient of the normal prediction and 1–C being the weight coefficient of the ground truth. A higher confidence score means that the prediction carries more weight, whereas a lower confidence score means that the ground truth carries more weight.

The model training process can include the step of computing the loss based on the uncertainty-weighted predictions (operation 912). In some embodiments, the loss can also be augmented with a regularization term to prevent the model from leaning heavily toward low confidence. The regularization loss can be computed as the negative logarithm of the confidence score multiplied by an adjustable hyperparameter $\lambda_1$. In further embodiments, $\lambda_1$ can be adjusted based on an uncertainty cap that limits the maximum value of the regularization loss. $\lambda_1$ can be adjusted downwardly when $L_{regulatization} \geq L_{cap}$ and upwardly when $L_{regulatization} < L_{cap}$.

The model training process can further include the step of computing the gradient of the loss (operation 914) and determining whether the loss is minimized based on the gradient (operation 916). In some embodiments, a backpropagation algorithm can be used to compute the gradient of the loss. If the loss is minimized, the training process can terminate. Otherwise, the model parameters can be updated (operation 918), and the updated model can make further predictions (operation 908).

In the example shown in FIG. 9, the uncertainty estimation is applied to all training samples. In practice, the uncertainty estimation may only be applied to a subset of the training samples (e.g., a fraction of samples in each batch) during the model training process. In one example, a subset of the training samples can be randomly selected, and a static confidence score of 100% can be assigned to predictions made based on the selected training samples.

Figure 10:
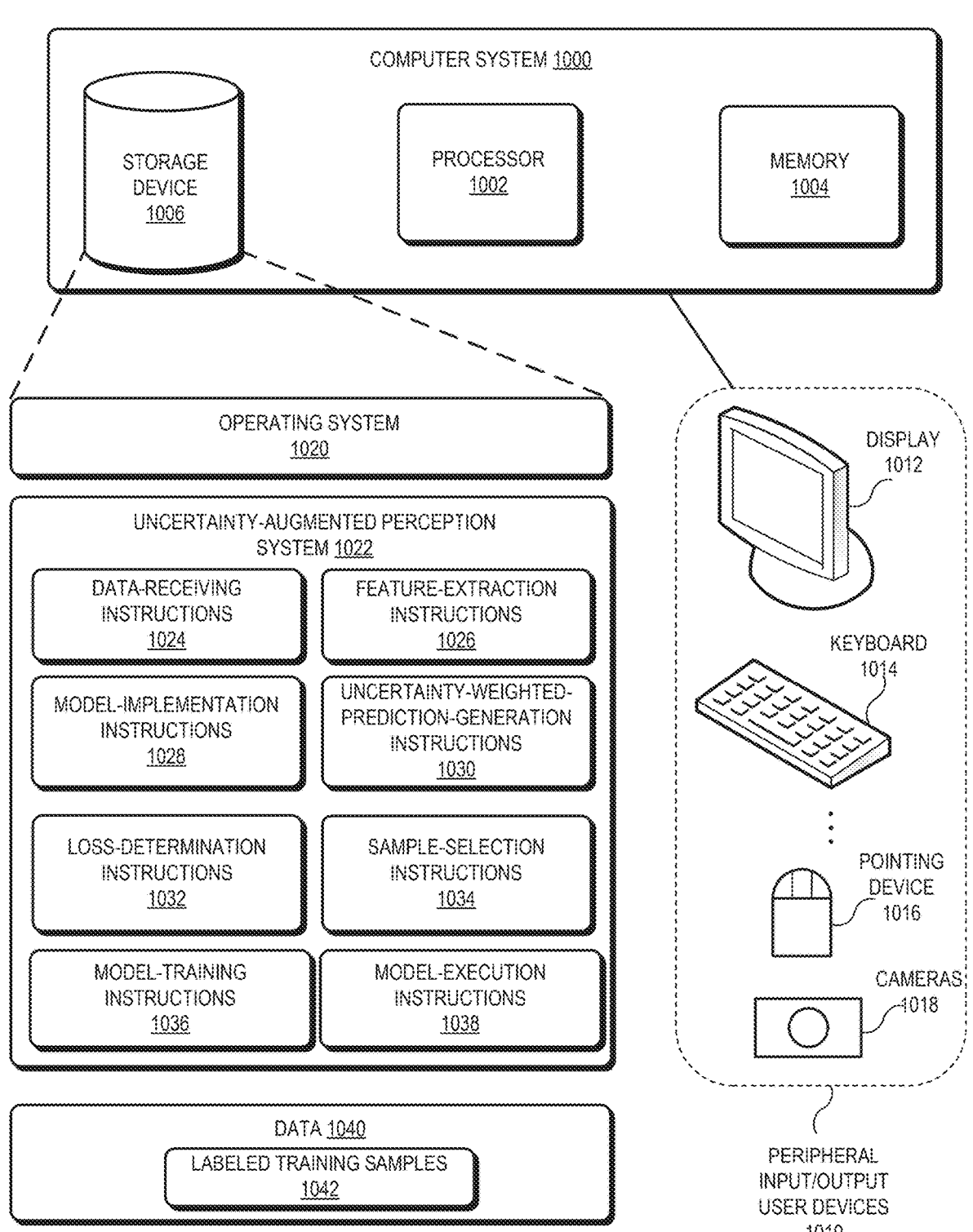
FIG. 10 illustrates an exemplary computer system for an uncertainty-augmented perception system, according to one embodiment of the instant application.

FIG. 10 illustrates an exemplary computer system for an uncertainty-augmented perception system, according to one embodiment of the instant application. Computer system 1000 includes a processor 1002, a memory 1004, and a storage device 1006. Furthermore, computer system 1000 can be coupled to peripheral input/output (I/O) user devices 1010, e.g., a display device 1012, a keyboard 1014, a pointing device 1016, and cameras 1018. Storage device 1006 can store an operating system 1020, an uncertainty-augmented perception system 1022, and data 1040. In some embodiments, computer system 1000 can be implemented as part of an advanced driver-assistance system (ADAS) or an automated driving system (ADS) installed on a vehicle.

Uncertainty-augmented perception system 1022 can include instructions, which when executed by computer system 1000, can cause computer system 1000 or processor 1002 to perform methods and/or processes described in this disclosure. Specifically, uncertainty-augmented perception system 1022 can include instructions for receiving training data (data-receiving instructions 1024), instructions for extracting useful features from the training data (feature-extraction instructions 1026), instructions for implementing a machine-learning-based perception model (model-implementation instructions 1028), instructions for generating uncertainty-weighted predictions (uncertainty-weighted-prediction-generation instructions 1030), instructions for determining the loss function based on the uncertainty-weighted predictions (loss-determination instructions 1032), instructions for selecting a subset of samples to apply the confidence scores (sample-selection instructions 1034), instructions for training the machine-learning-based perception model (model-training instructions 1036), and instructions for executing the trained model (model-execution instructions 1038). Data 1040 can include labeled training samples 1042.

In general, this disclosure presents a solution to the problem of dealing with uncertainties in predictions by an autonomous driving perception system. More specifically, this disclosure can provide a straightforward and generalized method to implement uncertainty estimation in autonomous driving perception models, applicable to various autonomous driving perception tasks, such as map vectorization, 3D object detection, path prediction, semantic segmentation, motion prediction, speed estimation, etc. The perception model can incorporate uncertainty estimation in the model training phase, where each prediction head can predict, in addition to normal classification and regression predictions, a confidence score indicating the level of uncertainty associated with each prediction. The confidence score can be used to compute uncertainty-weighted predictions that are used to generate the loss. A regularization loss can also be introduced to penalize low-confidence predictions. The regularization loss can also be limited by an uncertainty cap.

The proposed solution addresses a critical gap in uncertainty estimation of autonomous driving perception in the current state of the art, enhancing the overall safety, reliability, and performance of autonomous driving systems. Although the BEV perception framework is used as an example throughout the disclosure, the proposed solution makes minimal assumptions for each individual perception task and necessitates minimal modifications to the existing neural network architectures in autonomous driving. Moreover, in addition to perception models, the proposed solution can also be applied to other types of machine learning models to enhance their prediction accuracy.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method for training a perception model to perform an autonomous driving task, the method comprising:
obtaining labeled training data comprising images captured by multiple cameras mounted at different locations on a vehicle;
generating, in parallel by the perception model based on the labeled training data, a prediction output associated with the task and a confidence score, wherein the confidence score indicates a level of uncertainty correlated with visibility of the cameras and associated with the prediction output;
generating an uncertainty-weighted prediction based on ground truth indicated by the labeled training data, the prediction output, and the confidence score, wherein generating the uncertainty-weighted prediction comprises computing a weighted combination of the prediction output and the ground truth, and wherein the prediction output is scaled by the confidence score and the ground truth is scaled by complement of the confidence score;
computing a loss function based on the uncertainty-weighted prediction; and
updating the perception model based on the loss function.

2. The method of claim 1, wherein the autonomous driving task comprises:
a map vectorization task;
an object detection task;
a semantic segmentation task; or
a path prediction task.

3. The method of claim 1, wherein the perception model comprises a Bird's Eye View (BEV)-based perception model.

4. The method of claim 1, wherein the prediction output comprises one or more of a classification prediction and a regression prediction.

5. The method of claim 1, wherein computing the loss function further comprises adding a regularization loss term, and wherein the regularization loss term is determined based on the confidence score and a hyperparameter.

6. The method of claim 5, wherein the hyperparameter is dynamically adjusted based on a cap value of the regularization loss term.

7. The method of claim 6, further comprising:
decreasing the hyperparameter in response to the regularization loss term being greater than or equal to the cap value; and
increasing the hyperparameter in response to the regularization loss term being less than the cap value.

8. The method of claim 1, further comprising:
selecting a subset of the labeled training data; and
associating prediction outputs generated based on the selected subset of labeled training data with a static confidence score.

9. A non-transitory computer-readable storage medium storing instructions that when executed by a computer cause the computer to perform a method for training a perception model to perform an autonomous driving task, the method comprising:
obtaining labeled training data comprising images captured by multiple cameras mounted at different locations on a vehicle;
generating, in parallel by the perception model based on the labeled training data, a prediction output associated with the task and a confidence score, wherein the confidence score indicates a level of uncertainty correlated with visibility of the cameras and associated with the prediction output;
generating an uncertainty-weighted prediction based on ground truth indicated by the labeled training data, the prediction output, and the confidence score, wherein generating the uncertainty-weighted prediction comprises computing a weighted combination of the prediction output and the ground truth, and wherein the prediction output is scaled by the confidence score and the ground truth is scaled by complement of the confidence score;
computing a loss function based on the uncertainty-weighted prediction; and
updating the perception model based on the loss function.

10. The non-transitory computer-readable storage medium of claim 9, wherein the perception model comprises a Bird's Eye View (BEV)-based perception model.

11. The non-transitory computer-readable storage medium of claim 9,
wherein the prediction output comprises a classification prediction and/or a regression prediction.

12. The non-transitory computer-readable storage medium of claim 9, wherein computing the loss function further comprises adding a regularization loss term, and wherein the regularization loss term is determined based on the confidence score and a hyperparameter.

13. The non-transitory computer-readable storage medium of claim 12, wherein the hyperparameter is dynamically adjusted based on a cap value of the regularization loss term, and wherein the method further comprises:
decreasing the hyperparameter in response to the regularization loss term being greater than or equal to the cap value; and
increasing the hyperparameter in response to the regularization loss term being less than the cap value.

14. The non-transitory computer-readable storage medium of claim 9, wherein the method further comprises:
selecting a subset of the labeled training data; and
associating prediction outputs generated based on the selected subset of labeled training data with a static confidence score.

15. A computing system, comprising:
a processor; and
a memory coupled to the processor and storing instructions that when executed by the processor cause the processor to perform a method for training a perception model to perform an autonomous driving task, the method comprising:
obtaining labeled training data comprising images captured by multiple cameras mounted at different locations on a vehicle;
generating, in parallel by the perception model based on the labeled training data, a prediction output associated with the task and a confidence score, wherein the confidence score indicates a level of uncertainty correlated with visibility of the cameras and associated with the prediction output;
generating an uncertainty-weighted prediction based on ground truth indicated by the labeled training data, the prediction output, and the confidence score, wherein generating the uncertainty-weighted prediction comprises computing a weighted combination of the prediction output and the ground truth, and wherein the prediction output is scaled by the confidence score and the ground truth is scaled by complement of the confidence score;

computing a loss function based on the uncertainty-weighted prediction; and updating the perception model based on the loss function.

16. The computing system of claim 15, wherein computing the loss function further comprises adding a regularization loss term, and wherein the regularization loss term is determined based on the confidence score and a hyperparameter.

17. The computing system of claim 16, wherein the hyperparameter is dynamically adjusted based on a cap value of the regularization loss term, and wherein the method further comprises:

decreasing the hyperparameter in response to the regularization loss term being greater than or equal to the cap value; and increasing the hyperparameter in response to the regularization loss term being less than the cap value.

* * * * *